UNITED STATES PATENT OFFICE.

PRESTON B. ROSE, OF ANN ARBOR, MICHIGAN.

FOOD COMPOUND.

SPECIFICATION forming part of Letters Patent No. 351,404, dated October 26, 1886.

Application filed October 23, 1885. Serial No. 180,748. (Specimens.)

*To all whom it may concern:*

Be it known that I, PRESTON B. ROSE, of the city of Ann Arbor, in the county of Washtenaw and State of Michigan, have invented a new and useful Improvement in Food Products and an Improved Method or Means for Producing the Same, of which the following is a specification.

The invention relates to an article of food for both human and animal consumption and the utilization of substances heretofore considered worthless for food or other purposes, and succinctly is as follows:

In the rendering of lard, tallow, or other fats a considerable quantity of water is necessarily present or introduced in the rendering-tanks, known in that industry as "tank-water." This tank-water, although apparently limpid, contains about ten per cent. of solid matter. Such tank-water has heretofore been simply an offensive element in the rendering of fats, and its disposition has been almost universally the discharge of the same in the sewers or to be disposed of with the other offensive surroundings of the rendering establishment, and such water is the principal source of the offensive and deleterious odors which arise in the rendering of fats. Attempts have been made to utilize this tank-water as a fertilizer, but, by reason of its peculiar character and the object to be obtained, they have met with indifferent success. The ten per cent. of solid matter contained in solution in this tank-water is organized substantially as follows: Mineral salts and an albuminous substance, of which there is gelatine or glue, syntonine, and perhaps other products. Of this ten per cent. of solid matter about fifteen per cent. of the same is nitrogen.

My food product and method or process of preparing the same is substantially as follows: First, the tank-water is drawn into separate vessels or apartments and there evaporated until the above-indicated solid matter remains about the consistency of sirup, and even in this condition it is a palatable and nutritious article of semi-liquid or solid food; second, this sirup is then thoroughly intermingled by hand or mechanical means with corn-meal, flour, or other farinaceous substance, and the new composition, so intermingled, is then subjected to heat or evaporation until it reaches the desired condition as an article of food. This intermingling may be done at any degree of heat, and either by means of steam-pressure or otherwise; third, this food-mixture product is then subjected to a grinding or pulverizing process by means of the ordinary grinding-mill or otherwise as its final best form for a food product.

Among the various farinaceous substances which may be used to advantage in my process because of their cheapness and general convenience, I mention, without, however, limiting myself to them alone, meal, brewers' grains, and the waste of glucose works and of distilleries. This admixture of sirup and farinaceous substances may be in any desired proportion; but I have found that twenty-five to thirty per cent. of sirup produces the best result and product. The proportions of the ingredients, however, may be varied as desired, and also the form of the product—that is, it may be ground or it may be pressed into the form of cakes.

The great superiority of such a food as herein described over that of corn alone consists in the increased amount of protein compounds or flesh-forming albuminoids that this tank-water holds in solution—namely, fifteen per cent. of nitrogen, not as ammonia, but as albuminoid. When thus properly mixed and reduced to dryness, it furnishes a most desirable food, in every way healthful and pleasant.

Having thus described my invention, what I claim as new, and desire to secure by Letters Patent, is—

The improved food product described herein, in dry or granular form, consisting of tank-waste incorporated with a farinaceous substance.

PRESTON B. ROSE.

Witnesses:
FREDERICK C. GOODWIN,
E. D. HUBER.